Oct. 12, 1965 KENZO MIYAZAKI 3,211,255
OIL MIST GENERATOR
Filed April 26, 1963 3 Sheets-Sheet 1

INVENTOR.
KENZO MIYAZAKI
BY McGrew and Toren
ATTORNEYS

Oct. 12, 1965    KENZO MIYAZAKI    3,211,255
OIL MIST GENERATOR

Filed April 26, 1963    3 Sheets-Sheet 2

INVENTOR.
KENZO MIYAZAKI
BY
ATTORNEYS

Oct. 12, 1965   KENZO MIYAZAKI   3,211,255
OIL MIST GENERATOR
Filed April 26, 1963   3 Sheets-Sheet 3
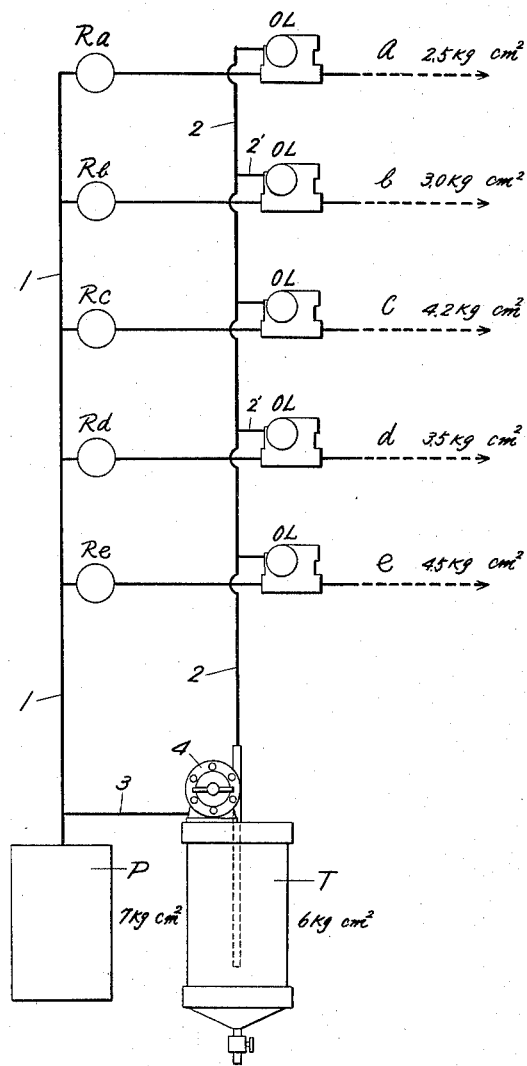
INVENTOR.
KENZO MIYAZAKI
BY McGrew and Torin
ATTORNEYS

United States Patent Office 3,211,255
Patented Oct. 12, 1965

3,211,255
OIL MIST GENERATOR
Kenzo Miyazaki, 15 3-chome, Tsurumaki-cho,
Setagaya-ku, Tokyo, Japan
Filed Apr. 26, 1963, Ser. No. 276,004
Claims priority, application Japan, May 28, 1962,
37/21,882
2 Claims. (Cl. 184—55)

This invention relates to an oil mist generator. It is known that, in an air damping or pressure air system, each individual component or branch of the piping system should be provided with an automatic oiler, usually termed an oiler, by means of which a mist is generated. This mist is then diffused into the air current of each branch to supply an oil mist to each of the branches of the air damping system. In this conventional oiler, however, oil is supplied to the mist generating portion by the respective pressure of the air current which passes through the air path of each mist generator. Therefore, the pressure of the feed oil should necessarily be the same as that of the air in the air path. Namely, if the pressure of the feed oil is lower than that of the air, it becomes impossible to feed the oil to enable the generation and supply of oil mist. Conversely, in case the feed oil pressure is higher than the air pressure, unmisted oil enters into the branches to impede the operation of the air damping mechanism. In addition, an air damping mechanism or pressure air system usually is provided with numerous branches, which in most cases require different air pressures. Further, even when respective branches are uniform in air pressure requirements, they are not the same in height of installed positions. Thus, air damping mechanisms are complex and different in mode.

Since air damping mechanisms differ in mode as illustrated above, it is entirely impossible to use, in the case of air damping mechanisms using conventional oilers, one common oil tank to feed oil to all the branches under a definite oil pressure. Therefore, the conventional air damping mechanism must necessarily have such a structure that each oiler is provided with an oil ball (that is an oil tank reservoir of small capacity) and oil is fed to and misted in each oiler itself to generate and supply the oil mist. For these reasons, in conventional oilers, the major portion of the structure is occupied by oil balls, resulting in the economical disadvantages that the cost of the oiler becomes expensive and the structure thereof is required to be larger. Further, in operation, the conventional air damping mechanisms are inconvenient and troublesome in that the amount of oil remaining in respective oilers must be constantly monitored and oil must be supplied to numerous individual oilers. Moreover, the generation of mist varies depending upon the level of the oil surfaces of respective oil balls. Thus, the conventional oil mist generators suffer from many drawbacks.

In accordance with the present invention, the aforesaid many unavoidable drawbacks of conventional oilers can be completely eliminated.

In the drawings:

FIG. 4 is a flow sheet of a pressure air system utilizing the oil mist generators of the invention.

Figure 1:
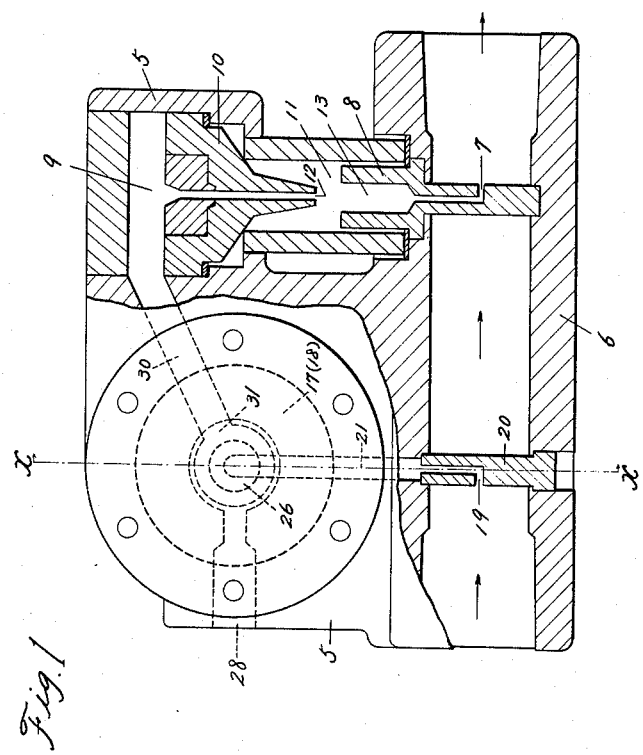
FIG. 1 is a side elevation view, partly in section, of one embodiment of oil mist generator in accordance with the invention, and illustrating the connections with the air path and the oil feed.

Before describing the oil mist generator of the present invention, the outline of the piping ssytem, in which the present oil mist generators are employed, will be described with reference to FIG. 4. In FIG. 4, each character OL represents the instant oil mist generator. $a$, $b$, $c$, $d$, and $e$ are pipings or branches different, respectively, in air pressure or in height of installed position. For example, branch $a$ is maintained at an air pressure of 2.5 kg./cm.$^2$; $b$, 3.0 kg./cm.$^2$; $c$, 4.2 kg./cm.$^2$; $d$, 3.5 kg./cm.$^2$; and $e$, 4.5 kg./cm.. Compression pump P, employed as a compressed air source for charging air into said pipings, is controlled so as to charge air at about 7 kg./cm.$^2$, taking into consideration the maximum air pressure of 4.5 kg./cm.$^2$ of the piping $e$ in the piping system and the pressure drop along the feeding pipe. The air thus charged is controlled and reduced to the given pressures of respective pipings, and delivered to the air mechanism by way of air pressure controllers or pressure reducers R$a$, R$b$, R$c$, R$d$, and R$e$, which are inserted in the inlets of respective pipings or branches $a$, $b$, $c$, $d$, and $e$. The arrangement of each piping and the delivery of air thereto are the same as have been adopted in conventional mechanisms. However, the oil feeding means of the pressure feed oil system are entirely different from conventional ones, namely, in the present oil mist generator, each oiler is not provided with an individual oil ball, unlike the conventional oilers. Therefore, the oilers of the present invention are independently inserted as units OL in respective pipings and oil is fed under a uniform pressure to all the oilers OL from one common oil tank T, which is connected through pipe 3 to compression pump P, through one oil feeding pipe 2 and respective branched oil pipes 2'. In this case, the feed oil pressure may be selected considering only the pressure of 4.5 kg./cm.$^2$ of the maximum air pressure piping $e$ and the pressure loss along the oil feeding pipe, without taking any other conditions into consideration. That is, oil fed at a definite pressure of about 5 kg./cm.$^2$ is sufficiently satisfactory for the generation of oil mist and the action of the air mechanism. Such a pressure oil feeding system has never been proposed heretofore.

The basic idea of the present invention will now be described.

The present invention relates to an oil mist generator characterized in that a diaphragm means comprising two sheet diaphragms is stretched in a mist generator so as to provide, adjacent respective outer surfaces of the diaphragms, an air pressure chamber and an oil pressure chamber. The air pressure chamber is provided with an air inlet pipe having an air inlet hole open to the pressurized air current of the air path. The oil pressure chamber is provided with an oil feeding pipe and connected to an oil mist generating portion having an oil injecting nozzle opening in the same direction as the air flow. There thus is formed a pressure equilibrium mechanism comprising diaphragms, wherein the oil path of the oil feeding side can be opened or closed by a valve connected to the diaphragm means of the thus formed pressure equilibrium mechanism.

An object of the present invention is to provide an oil mist generator characterized by the fact that, when used in air damping mechanisms, oil can be fed at a definite pressure to all the pipings, regardless of whether the air pressure of the respective pipings is high or low, or no matter how the pressure of the feed oil differs from that of air, wherein the oil mist generator itself is automatically controlled by means of the aforesaid pressure equilibrium mechanism so as to make the air pressure always identical with the feed oil pressure, thereby to achieve completely and satisfactorily the generation and supply of mist without the supply being affected by the difference in air pressure of the respective pipings and the difference between air pressure and feed oil pressure which is necessarily caused in each generator. In other words, the present invention provides a compact and inexpensive oil mist generator means having no oil balls therein. The use of the present mist generator makes it possible to establish a markedly simple oil feeding system in which oil is fed to all the pipings by use of one common oil tank and one common oil feeding pipe. The present oil mist generator is entirely safe from leakage of crude oil and is so excellent in function that the oil mist generated is satisfactorily supplied according to the variations in flow of the pressurized air.

Figure 2:
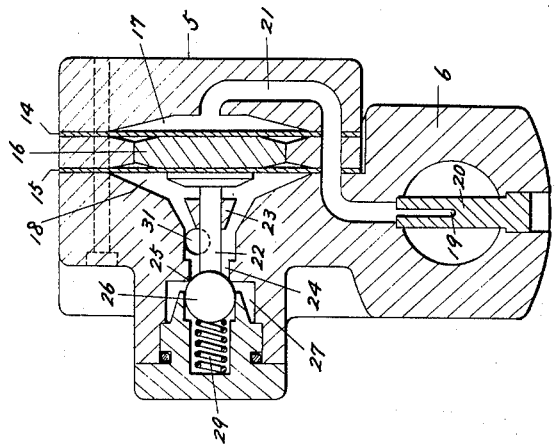
FIG. 2 is a transverse sectional view of the generator shown in FIG. 1, taken along the line X—X.
Figure 3:
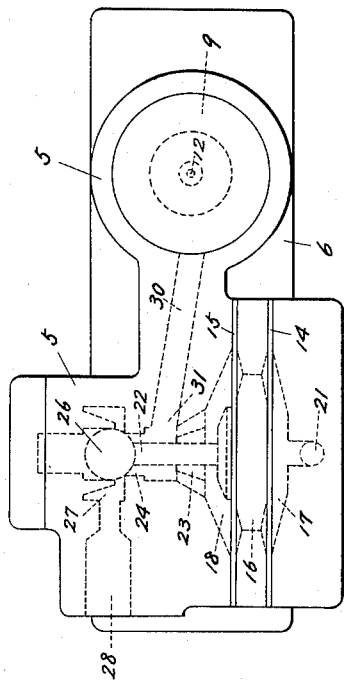
FIG. 3 is a plan view of the generator shown in FIG. 1.

The structure of the present oil mist generator will be described referring to FIGS. 1 to 3. The present oil mist generator is made by providing in a tightly closed hollow vessel 5, a mist generating portion and a pressure equilibrating portion both of which are connected to the air path 6 of the generator itself. The mist generating portion is devised to generate oil mist by providing, at the lower part of the hollow vessel, the injection pipe 8 having the oil injection outlet 7 opening in the same direction as the air current flow, providing the oil feeding chamber 9 at the top, and interposing therebetween the intermediate baffle plate or nozzle 10 to form an oil dropping chamber 11 below the plate. Baffle plate 10 is perforated at the center to provide the oil dropping hole 12, wherein the pressure oil in the oil feeding chamber 9 is dropped into the chamber 11 through the oil dropping hole 12. Thereby the oil reaches the oil injection outlet 7 through the oil receiving portion 13 of the injection pipe 8 and is injected as oil mist into the air path. The pressure equilibrating portion is devised as follows: At the center of the pressure equilibrating portion, two vertically oriented diaphragms 14, 15 are provided in parallel with each other. Between the diaphragms, the pressure transmitting plate 16 is inserted so that both diaphragms are oscillated as a unit. One of the diaphragms, for example the right side diaphragm 14 in FIG. 2, has, adjacent its outer surface, the air pressure chamber 17 in the form of a dish, while the left hand diaphragm 15 has, adjacent its outer surface, the funnel like oil pressure chamber 18. The air pressure chamber 17 is connected to the air inlet pipe 20 having air inlet hole 19 opening in the reverse direction to the air current. Both parts 17 and 20 are connected by a passage 21 provided within the body of the vessel, so that the air pressure chamber 17 is always maintained at the same pressure as that of the piping system in the vessel. The oil pressure chamber 18 has extending therethrough horizontally the valve rod 22, which is fixed to the side of diaphragm 15 and which is supported by the bearing 23 so that it is horizontally movable. The left end of said valve rod extends through the oil inlet 24 provided at the end of the oil pressure chamber, and the extended end of the valve rod is attached to the ball valve 26 engaging the valve seat 25 on the wall of the oil inlet 24. The portion where the ball valve 26 is placed is somewhat enlarged and connected, as the oil chamber 27, to the oil inlet connection 28. At the back side of the ball valve, the controlling spring 29 is placed, which pushes the valve in the direction of the diaphragm. Further, the oil pressure chamber 18 is connected through the oil passage 30 provided within the vessel body with the oil feeding chamber 9 at the aforesaid mist generation mechanism. Therefore, when both sides of the diaphragms are in an equilibrium state, the ball valve 26 is pressed to the valve seat 25 to close the valve, where by the pressure oil from the common oil tank T is prevented from entering the oil pressure chamber 18, whereas, when the pressure of the air pressure chamber 17 is higher than that of the oil pressure chamber 18 and the equilibrium of the diaphragm is upset, the ball valve 26 is pressed to the left in FIG. 2, whereby the valve is opened more or less to allow the pressure oil in the oil chamber 27 to flow into the oil pressure chamber 18. The oil is thus supplied through the oil path 30 to the oil feeding chamber 9 of the mist generating portion. If the degree of the opening of the valve is high or the oil is supplied excessively, the diaphragm is pressed to the right and, accordingly, the ball valve is moved to the right, whereby the clearance between the valve and the valve seat is reduced to decrease the amount of oil supplied. Thus, in the present oil mist generator, the feed oil pressure for the generation of mist is automatically balanced with the air pressure in the pipings of the generator. Port 31 connects oil path 30 with the oil pressure chamber.

In the following, the function of the present oil mist generator will be illustrated with reference to the flow sheet shown in FIG. 4 wherein the present generators are actually employed:

When the operation of theair damping mechanism ceases and no air is present in the pipings, both the air pressure chamber and the oil pressure chamber in the mist generator attached to all the pipings are free from air pressure, and hence are under an equal pressure, whereby the diaphragms are equilibrated and accordingly return to the normal position to close the ball valve. Therefore, the oil in the oil feeding chamber 9 is not dropped and the generation of mist is discontinued. In this case, no oil flows into the pipings. When the air mechanism is started to operate and the pressure air is supplied to each piping, the pressure air is introduced through the air inlet 19 into the air pressure chamber 17. Consequently, the air pressure in the air pressure chamber 17 becomes equal to that of the piping 6 to press the diaphragm in FIG. 2 to the left. On the other hand, the air pressure in the oil dropping chamber 11 becomes a negative pressure due to the oil spray from the oil injection outlet and the negative pressure is propagated into the oil pressure chamber 18 through the oil dropping chamber 11, oil dropping hole 12, oil feeding chamber 9 and oil path 30 in this order, whereby the diaphragm is pressed in the direction contrary to the pressure of the air pressure chamber, i.e., to the right. In this case, however, the pressure in the air pressure chamber 17 is higher than that in the oil pressure chamber 18, whereby the ball valve is more or less opened and the pressure oil from the external pressure pipe 2 is introduced into the oil pressure chamber 18 through the oil inlet connection 28, oil chamber 27 and the clearance between the ball valve and the valve seat. Therefore, the pressure oil is fed to the oil feeding chamber 9 to initiate the dropping of the oil and the oil is injected through the oil injection nozzle to achieve the desired oil supply for mist generation.

In this instance, respective pipings *a*, *b*, *c*, *d*, and *e* are maintained under a definite pressure, as mentioned before, and oil is introduced therein under a considerably higher pressure by means of the common pipe 2. Therefore, the feed oil pressure is considerably high as compared with the air pressure of any of the pipings and particularly there is a great pressure difference in the case of piping *a* which is maintained at the lowest pressure. However, the higher the oil pressure, the greater becomes the oil pressure in the oil pressure chamber, whereby the diaphragm of the oil pressure chamber 18 is strongly pressed in the direction of the air pressure chamber 17. Accordingly, the clearance formed by the ball valve provided for the introduction of oil is minimized, and the ball valve operates so that the pressure of the oil pressure chamber 18 is approximately equilibrated with that of the air pressure chamber. Consequently, the oil pressure in the oil feeding chamber 9 is always controlled automatically so as to make it equal to the air pressure of respective pipings. Therefore, no matter how the feed oil pressure is higher than the air pressures of pipings or how respective pipings are different in air pressure, the feed oil pressure for dropping and the air pressure of each piping are equilibrated automatically, regardless of such pressure difference, to carry out satisfactory oil supply for mist generation. Such performance and advantages of the present generator are excellent features which have not been provided heretofore.

By virtue of the above functions and the high feed oil pressure, the present oil mist generator is entirely free of danger of oil leaks into the pipings. Even if the operation of the air damping mechanism has stopped for some reason and pressure air has remained therein, both air pressure chamber 17 and oil pressure chamber 18 are subjected to the same pressure of the air path, whereby both chambers are equilibrated in pressure to close the ball valve 26. Therefore, even when the oil feeding is continued, no oil enters into the pipings. For the same reasons as above, even when numerous pipings are provided in positions different in height, the effect of mist generation is attained without any obstacle.

To summarize, the present oil mist generator is markedly excellent and convenient because of the fact that even when it is applied to complex air pipings different in mode, the oil pressure is automatically controlled in the mist generator itself so as to be suitable for respective pipings, entirely regardless of environmental conditions, whereby a satisfactory oil feeding for mist generation is carried out without danger from any leakage of oil. Accordingly, the present generator requires no parts for individual oil tanks, contrary to the case of conventional oilers, whereby the cost of the oiler can be greatly lowered. Moreover, it is not necessary to monitor many oilers and supply oil thereto, unlike the case where conventional oilers are employed, so that the operation of the air damping mechanism is made markedly simple and convenient.

It should be said, therefore, that the present invention provides an excellent oil mist generator which is completely novel.

What I claim is:

1. In combination, a pressure air system, including a source of air under pressure, a main supply line connected to said source, and plural branch lines each connected to said main supply line, each branch line operating at a respective branch line pressure, and at least some of said branch line pressures differing from others of said branch line pressures; plural oil mist generators each disposed in a respective branch line; a source of oil under pressure; an oil feed line connected to said source of oil under pressure; branch oil supply lines each connecting said oil feed line to a respective oil mist generator; the pressure of said source of oil under pressure having a value such that the oil supplied to each oil mist generator is at a pressure substantially equal to the highest of said branch line air pressures; and pressure responsive means in each oil mist generator connected to the respective air branch line and to the respective branch oil supply line and operable to deliver an oil mist to the respective air branch line at a rate proportional to the air pressure in the respective air branch line.

2. In the combination claimed in claim 1, each oil mist generator comprising a substantially sealed casing means enclosing an interior cavity and formed with an air flow passage included in the respective air branch line, flexible diaphragm means dividing said cavity into first and second chambers, means connecting the first chamber to the respective air branch passage at a first point therealong for application of the air pressure to one side of said diaphragm, oil mist generator means connecting the second chamber to the respective air branch passage at a second point therealong downstream of said first point; means connecting the respective branch oil supply line to the second chamber for application of the oil pressure to the other side of the diaphragm means, normally closed check valve means between the respective branch oil supply line and the second chamber and blocking flow of oil to the second chamber, and valve operating means operatively connecting the diaphragm means to the check valve means and effective to open the check valve means when the air pressure in the first chamber exceeds the oil pressure in the second chamber.

References Cited by the Examiner

UNITED STATES PATENTS

| | | | |
|---|---|---|---|
| 1,356,166 | 10/20 | Marsh | 184—56 |
| 1,907,464 | 5/33 | Terry | 184—55 |
| 2,096,125 | 10/37 | McDougall | 251—24 |
| 2,269,276 | 1/42 | Lichtenstein | 73—213 |
| 2,982,376 | 5/61 | Lincoln | 184—55 |
| 3,023,849 | 3/62 | Tine | 184—55 |
| 3,040,835 | 6/62 | Ahnert | 184—55 |
| 3,115,950 | 12/63 | Malec | 184—55 |

LAVERNE D. GEIGER, *Primary Examiner.*

MILTON KAUFMAN, *Examiner.*